(12) United States Patent
Goossen et al.

(10) Patent No.: US 8,162,256 B2
(45) Date of Patent: Apr. 24, 2012

(54) LAUNCH AND CAPTURE SYSTEMS FOR VERTICAL TAKE-OFF AND LANDING (VTOL) VEHICLES

(75) Inventors: Emray R. Goossen, Albuquerque, NM (US); Yogendra Y. Sheoran, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1052 days.

(21) Appl. No.: 12/051,552

(22) Filed: Mar. 19, 2008

(65) Prior Publication Data
US 2009/0236470 A1    Sep. 24, 2009

(51) Int. Cl.
*B64F 1/00* (2006.01)
(52) U.S. Cl. .................. 244/110 E; 244/114 R
(58) Field of Classification Search .............. 244/115, 244/116, 114 R, 110 F, 110 G, 110 E, 110 D, 244/110 R
See application file for complete search history.

(56) References Cited

U.S. PATENT DOCUMENTS

| | | | |
|---|---|---|---|
| 1,705,432 A * | 3/1929 | Westcott | 244/110 R |
| 2,268,320 A * | 12/1941 | Brandt | 244/114 R |
| 2,807,429 A * | 9/1957 | Hawkins, Jr. et al. | 244/114 R |
| 3,645,478 A | 2/1972 | Madelung | |
| 3,966,142 A | 6/1976 | Corbett et al. | |
| 4,085,911 A | 4/1978 | Nahodyl | |
| 4,123,020 A * | 10/1978 | Korsak | 244/116 |
| 4,201,480 A * | 5/1980 | Brand | 366/79 |
| 4,236,686 A | 12/1980 | Barthelme et al. | |
| 4,523,729 A | 6/1985 | Frick | |
| 4,541,594 A * | 9/1985 | Foley | 244/114 B |
| 4,762,295 A | 8/1988 | Yon, Jr. | |
| 4,795,111 A | 1/1989 | Moller | |
| 5,054,717 A | 10/1991 | Taylor | |
| 5,155,992 A | 10/1992 | Follensbee et al. | |
| 5,170,963 A | 12/1992 | Beck, Jr. | |
| 5,201,480 A * | 4/1993 | Nenstiel | 244/110 R |
| 5,303,879 A | 4/1994 | Bucher | |
| 5,351,911 A | 10/1994 | Neumayr | |
| 5,395,643 A | 3/1995 | Brown et al. | |
| 5,419,513 A | 5/1995 | Flemming, Jr. et al. | |
| 5,421,538 A | 6/1995 | Vassa (Suratano Thienphropa) | |
| 5,507,453 A | 4/1996 | Shapery | |
| 5,560,568 A | 10/1996 | Schmittle | |
| 5,575,438 A | 11/1996 | McGonigle et al. | |

(Continued)

FOREIGN PATENT DOCUMENTS

EP    0960812 A1    1/1999

(Continued)

OTHER PUBLICATIONS

U.S. Appl. No. 11/492,490 entitled Micro Air-Vehicle Transport Container and Launch System, filed Jul. 25, 2006.

(Continued)

*Primary Examiner* — Tien Dinh
(74) *Attorney, Agent, or Firm* — Shumaker & Sieffert, P.A.

(57) ABSTRACT

A launch and capture system for capturing a vertical take-off and landing (VTOL) vehicle having a thruster and a duct configured to direct airflow generated by the thruster includes a capture plate and an extension. The capture plate is configured to alter the airflow and generate a force attracting the duct to the capture plate. The extension is coupled to the capture plate, and is configured to at least facilitate holding the VTOL vehicle against the capture plate.

19 Claims, 11 Drawing Sheets

U.S. PATENT DOCUMENTS

| | | | |
|---|---|---|---|
| 5,758,844 | A | 6/1998 | Cummings |
| 5,799,900 | A | 9/1998 | McDonnell |
| 5,890,441 | A | 4/1999 | Swinson et al. |
| RE36,487 | E | 1/2000 | Wainfan |
| 6,050,520 | A | 4/2000 | Kirla |
| 6,170,778 | B1 | 1/2001 | Cycon et al. |
| 6,264,140 | B1 | 7/2001 | McGeer et al. |
| 6,270,038 | B1 | 8/2001 | Cycon et al. |
| 6,343,768 | B1 | 2/2002 | Muldoon |
| D459,286 | S | 6/2002 | Miralles et al. |
| 6,450,445 | B1 * | 9/2002 | Moller ............... 244/23 A |
| 6,464,166 | B1 | 10/2002 | Yoeli |
| 6,464,459 | B2 | 10/2002 | Illingworth |
| 6,502,787 | B1 | 1/2003 | Barrett |
| 6,520,449 | B2 | 2/2003 | Illingworth |
| 6,547,180 | B1 | 4/2003 | Cassidy |
| 6,550,715 | B1 | 4/2003 | Reynolds et al. |
| 6,561,456 | B1 | 5/2003 | Devine |
| 6,575,401 | B1 | 6/2003 | Carver |
| 6,581,872 | B2 | 6/2003 | Walmsley |
| 6,588,701 | B2 | 7/2003 | Yavnai |
| 6,604,706 | B1 | 8/2003 | Bostan |
| 6,607,162 | B2 | 8/2003 | Warsop et al. |
| 6,616,094 | B2 | 9/2003 | Illingworth |
| 7,114,680 | B2 | 10/2006 | Dennis |
| 7,185,538 | B2 | 3/2007 | Hager et al. |
| 7,280,917 | B2 | 10/2007 | Hager et al. |
| 2002/0060267 | A1 | 5/2002 | Yavnai |
| 2002/0100834 | A1 | 8/2002 | Baldwin |
| 2002/0113165 | A1 | 8/2002 | Moshier |
| 2004/0256519 | A1 | 12/2004 | Ellis et al. |
| 2005/0109874 | A1 | 5/2005 | Baldwin |
| 2006/0101923 | A1 | 5/2006 | Hager et al. |
| 2006/0106558 | A1 | 5/2006 | Hager et al. |
| 2006/0192047 | A1 | 8/2006 | Goossen |
| 2006/0249622 | A1 | 11/2006 | Steele |
| 2006/0249623 | A1 | 11/2006 | Steele |
| 2007/0158498 | A1 | 7/2007 | Snediker |
| 2007/0221790 | A1 | 9/2007 | Goossen et al. |
| 2007/0228214 | A1 * | 10/2007 | Horak ............... 244/63 |
| 2007/0243505 | A1 | 10/2007 | Rath et al. |
| 2007/0244608 | A1 | 10/2007 | Rath et al. |
| 2007/0250260 | A1 | 10/2007 | Ariyur et al. |
| 2008/0059065 | A1 | 3/2008 | Strelow et al. |

FOREIGN PATENT DOCUMENTS

| | | | |
|---|---|---|---|
| WO | 03004353 | A2 | 1/2003 |

OTHER PUBLICATIONS

U.S. Appl. No. 11/947,585 entitled Ducted Fan Air Vehicle with Deployable Wings filed Nov. 29, 2007.

U.S. Appl. No. 11/470,099 entitled Method for Collision Avoidance of Unmanned Aerial Vehicle with Other Aircraft, filed Sep. 5, 2006.

U.S. Appl. No. 11/753,017 entitled Flight Path Planning to Reduce Detection of an Unmanned Aerial Vehicle, filed May 23, 2007.

U.S. Appl. No. 11/434,539 entitled Relative Navigation for Aerial Refueling of an Unmanned Aerial Vehicle, filed May 15, 2006.

U.S. Appl. No. 11/470,152 entitled Method and System for GPS-Denied Navigation of Unmaned Aerial Vehicles, filed Sep. 5, 2006.

U.S. Appl. No. 11/430,211 entitled Simulation to Validate UAV Flight and Algorithms filed May 8, 2006.

U.S. Appl. No. 11/765,169 entitled Power Starter for Micro Air Vehicles filed Jun. 19, 2007.

Extended European Search Report from corresponding EP Application No. 09153384.4, mailed Jan. 30, 2012, 4 pages.

* cited by examiner

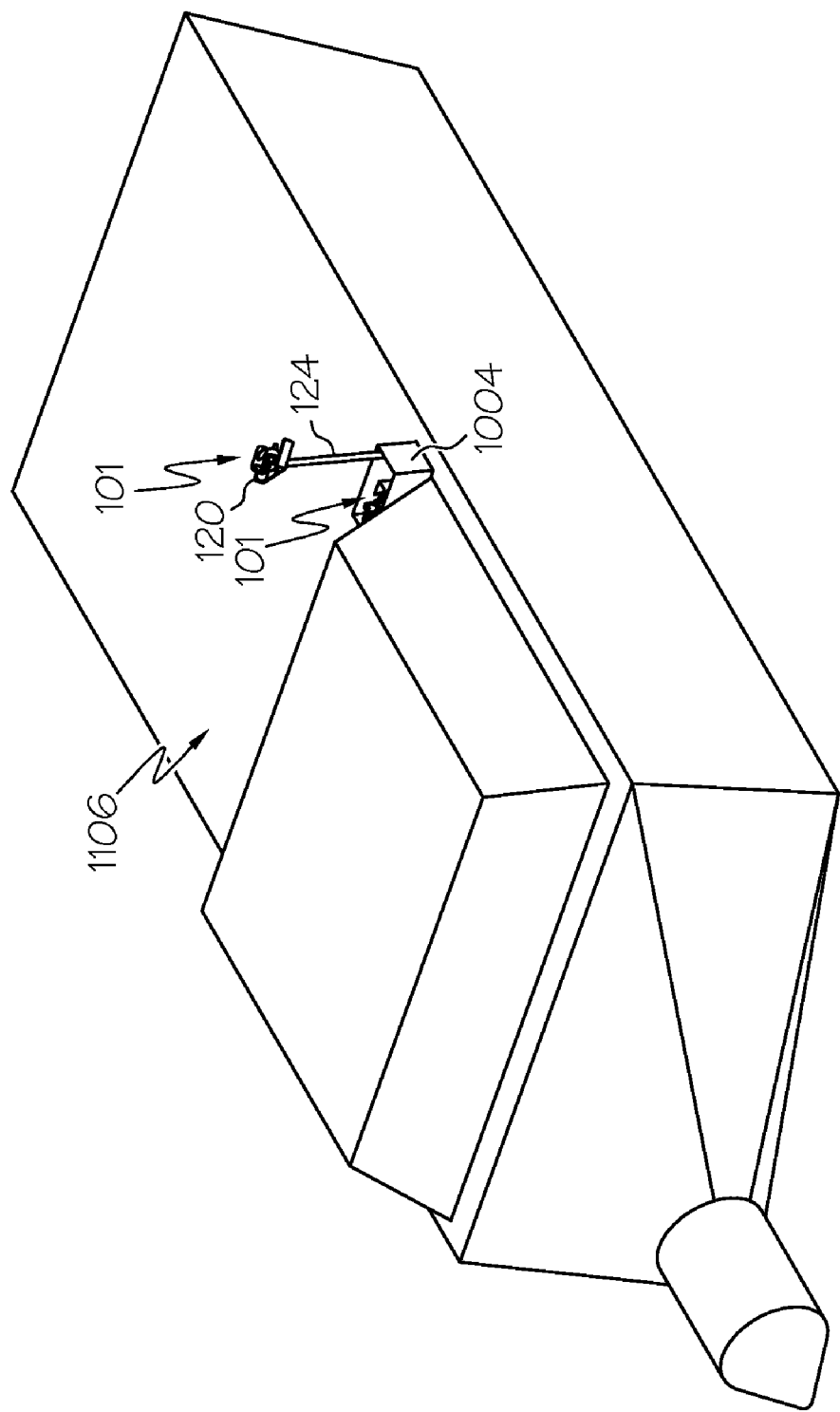

LAUNCH AND CAPTURE SYSTEMS FOR VERTICAL TAKE-OFF AND LANDING (VTOL) VEHICLES

TECHNICAL FIELD

The present invention relates to vertical take-off and landing (VTOL) vehicles and, more particularly, to launch and capture systems for VTOL vehicles.

BACKGROUND

Vertical take-off and landing (VTOL) vehicles are often used in providing reconnaissance, among other functions, and allow access to areas that may not be feasible with conventional aircraft. In particular, ducted fan VTOL vehicles are known for superior stationary aerodynamic hovering performance and low speed flights. However, attempts at achieving autonomous launch and capture of such VTOL vehicles, for example from moving recovery vehicles, have been limited to date.

VTOL capture devices often depend on a VTOL vehicle's precise vertical descent and landing onto a landing platform. The ability of a VTOL vehicle to land on a precise landing platform can be difficult, and is dependent on the vehicle control system and control effector authority with the vehicle in a low power thrust mode in which margins are small. This can be even more difficult in situations in which the landing platform is mounted on a moving recovery vehicle, for example because the task of landing the VTOL vehicle on a precise location on the moving recovery vehicle limits the range of motion of the moving recovery vehicle as well as the environmental conditions, such as wind conditions, under which a capture can take place.

Other systems used to capture VTOL vehicles include net capture systems (for example, in which a VTOL vehicle flies into a hoisted net on a recovery vehicle) and a tail hook and winch system (for example, in which a hook is mounted on the VTOL vehicle and captures a mounted lanyard on a recovery vehicle). However, similar to the technique described above in which the VTOL vehicle lands vertically on a precise location, such systems also do not support an autonomous capture and precision locating technique for the VTOL vehicle. Nor do any of these systems offer a combined autonomous launch and capture capability.

Accordingly, it is desirable to provide a system for improved capture of a VTOL vehicle. It is also desirable to provide improved VTOL capture devices that offer a combined launch and capture capability, and/or that provide for improved capture and/or launch of VTOL vehicles on moving recovery vehicles. It is also desirable to provide a VTOL launch and capture capability combined with a precision VTOL placement on the recovery vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment of the present invention, a launch and capture system for capturing a vertical take-off and landing (VTOL) vehicle having a thruster and a duct configured to direct airflow generated by the thruster is provided. The launch and capture system comprises a capture plate and an extension. The extension is coupled to the capture plate, and is configured to alter the airflow and generate a force attracting the duct to the capture plate. The extension is configured to at least facilitate holding the VTOL vehicle against the capture plate.

In accordance with another exemplary embodiment of the present invention, a launch and capture system for capturing a vertical take-off and landing (VTOL) vehicle having a thruster and a duct configured to direct airflow generated by the thruster is provided. The launch and capture system comprises a capture plate and a mast. The capture plate is configured to alter the airflow and generate a force attracting the duct to the capture plate. The capture plate comprises a plurality of ports movable between an open position and a closed position. The mast is coupled to the capture plate.

In accordance with a further exemplary embodiment of the present invention, a system is provided. The system comprises a vertical take-off and landing (VTOL) vehicle and a capture plate. The VTOL vehicle comprises a thruster and a duct. The duct is configured to direct airflow generated by the thruster. The capture plate is configured to be coupled to the VTOL vehicle and to alter the airflow and generate a force attracting the duct to the capture plate.

BRIEF DESCRIPTION OF THE DRAWINGS

FIG. 11 is a perspective view of multiple VTOL vehicles, such as the VTOL vehicle of FIG. 1, each docked against a capture plate that is raised on a telescoping mast of a launch and capture system, such as the launch and capture system of FIG. 1, and mounted on a recovery ship, in accordance with an exemplary embodiment of the present invention;

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. For example, although the following description and the referenced Figures make reference to a double ducted fan hovering air vehicle, it will be appreciated that the present invention may also apply to various single ducted vehicles as well as vehicles having more than two ducts. Other particular configurations and exemplary embodiments discussed herein may similarly be varied, and are not intended to limit the scope of the invention.

Figure 1:
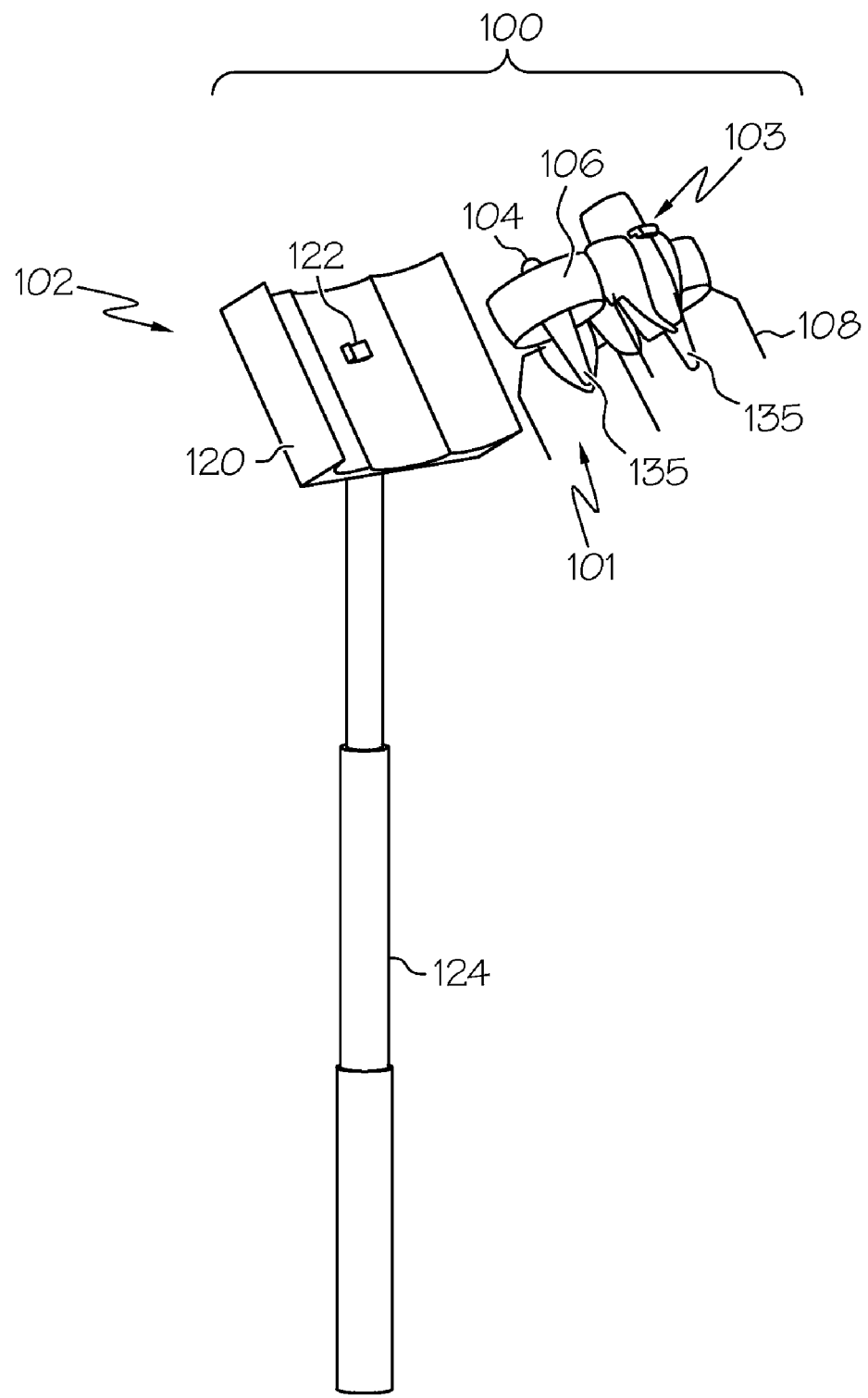
FIG. 1 is a perspective drawing of a vertical take-off and landing (VTOL) vehicle and a launch and capture system for the VTOL vehicle, in accordance with an exemplary embodiment of the present invention.

FIG. 1 is a perspective drawing of a system 100 in accordance with an exemplary embodiment of the present invention. The system 100 comprises a VTOL vehicle 101 and a launch and capture system 102. The launch and capture system 102 is configured to capture and selectively release the VTOL vehicle 101. FIG. 1 depicts the VTOL vehicle 101 in close proximity to the launch and capture system 102, for example, when the VTOL vehicle 101 is approaching the launch and capture system 102 for capture. It will be appreciated that in certain embodiments the launch and capture system 102 may be produced, sold, and/or distributed along with the VTOL vehicle 101, while in other embodiments the launch and capture system 102 may be produced, sold, and/or distributed separately, for example for different types of VTOL vehicles.

Figure 2:
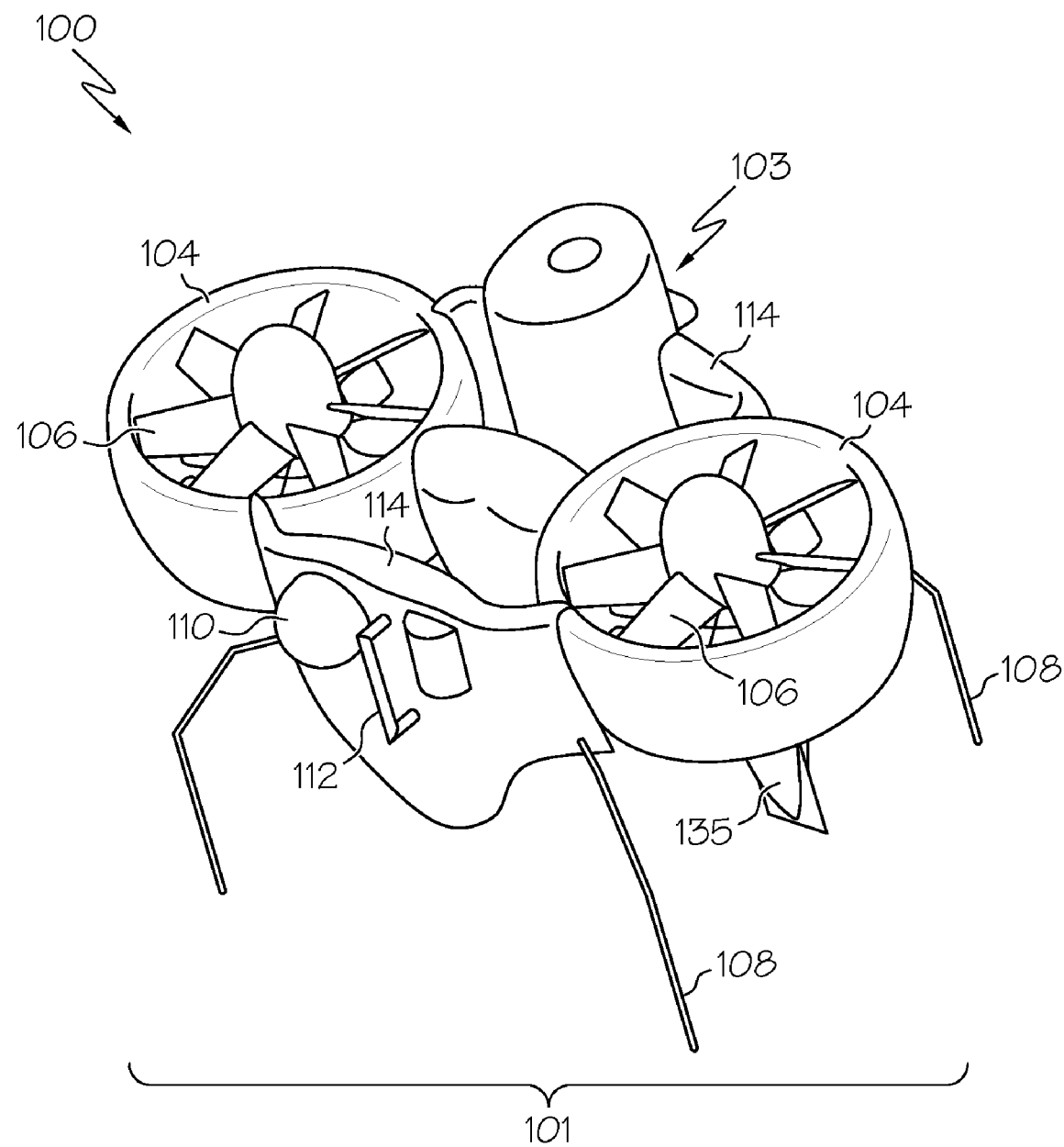
FIG. 2 is a close-up perspective view of the VTOL vehicle of FIG. 1, in accordance with an exemplary embodiment of the present invention.
Figure 3:
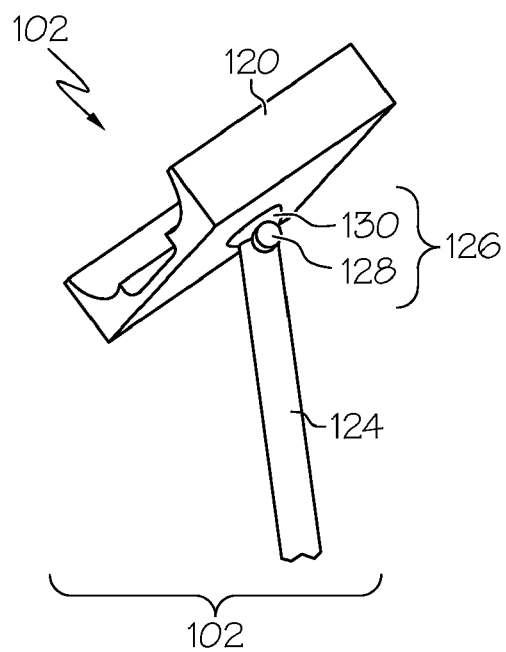
FIG. 3 is a close-up perspective view of the launch and capture system of FIG. 1, in accordance with an exemplary embodiment of the present invention.

FIGS. 2 and 3 depict close-up perspective views of the VTOL vehicle 101 and the launch and capture system 102, respectively, in accordance with an exemplary embodiment of the present invention. In certain embodiments, the launch and capture system 102 may be used to capture different types of VTOL vehicles 101. In addition, in certain embodiments, multiple VTOL vehicles 101 can be used in a system 100 with multiple launch and capture systems 102, for example with each launch and capture system 102 corresponding to a respective VTOL vehicle 101. In one such embodiment, each such launch and capture system 102 has a corresponding capture plate 120, for example as shown in FIGS. 11 and 12 and described further below in connection therewith.

As shown in FIG. 1 and in the close-up perspective view of FIG. 2, in the depicted embodiment the VTOL vehicle 101 comprises an engine 103, thrusters 104, ducts 106, landing gear 108, one or more sensors 110, and a capture bar 112. Each duct 106 with the adjoining pods 114 together from the VTOL body of the VTOL vehicle 101, and are configured along with the thrusters 104 to generate an airflow to at least facilitate movement of the VTOL vehicle 101 as a whole. Specifically, each duct 106 is coupled to a respective thruster 104, and is configured with control vanes 135 (preferably, a different control vane 135 for each respective thruster 104) to direct the airflow generated by the respective thruster 104.

The landing gear 108 is attached to the VTOL body, and facilitates landing of the VTOL vehicle 101. The one or more sensors 110 preferably are also attached to the VTOL body, and are configured to sense objects and/or other conditions surrounding the VTOL vehicle 101 and facilitate operation thereof. The capture bar 112 is attached to, coupled to, or formed integral with the VTOL body, and is configured to be engaged by the launch and capture system 102, to thereby hold the VTOL body against the launch and capture system 102 when the VTOL vehicle 101 is not operating. In the depicted embodiment, the capture bar 112 extends from the VTOL body. In other embodiments, the capture bar 112 may be implemented as a bar recessed in the VTOL body, for example in one or more bi-plane pods 114 shown in FIG. 1, or may be otherwise attached to, coupled to, or formed integral with the VTOL body.

In the depicted embodiment, each thruster 104 comprises a fan 104 housed within a respective duct 106, and each fan 104 is operated by an engine (not depicted). However, this may vary in other embodiments. Also in the depicted embodiment, the VTOL vehicle 101 is a double ducted VTOL vehicle with two ducts 106 and two fans 104 (one fan 104 corresponding to each duct 106); however, this may also vary in other embodiments. For example, in certain embodiments the VTOL vehicle 101 may include a single duct 106 and a single fan 104 or other thruster 104, while in other embodiments the VTOL vehicle 101 may include more than two ducts 106 and/or fans 104 or other thrusters 104. Various other features may also vary in other embodiments.

As shown in FIG. 1 and the close-up perspective view of FIG. 3, the launch and capture system 102 comprises a capture plate 120, an extension 122, a telescoping mast 124, and a servo system 126. The capture plate 120 is configured to alter the airflow of the ducts 106 of the VTOL vehicle 101, and to thereby generate a force attracting the ducts 106 (and, thereby, the VTOL vehicle 101) to the capture plate 120. Specifically, the capture plate 120 generates a gluing-type force with a Bernoulli effect attracting a duct 106 to the capture plate 120 when the duct 106 is within one half of its diameter from the capture plate 120, thereby disturbing the airflow.

The extension 122 (depicted in FIG. 1) is configured to engage the capture bar 112 of the VTOL vehicle 101. The extension 122 thereby assists in holding the VTOL body of the VTOL vehicle 101 (and thereby the VTOL vehicle 101 as a whole) against the capture plate 120, for example once the VTOL vehicle 101 is already disposed against the capture plate 120 and the thrusters 104 (or one or more engines controlling the thrusters 104) have been turned off. The extension 122 can be utilized to hold the VTOL vehicle 101 in place against the capture plate 120 while the VTOL vehicle 101 is positioned for storage or autonomous re-outfitting, or for launch and release. In the depicted embodiment, the extension 122 comprises a plurality of capture jaws 122 (and will hereafter be referenced as the capture jaws 122). However, it will be appreciated that the extension 122 may vary in other embodiments.

The telescoping mast 124 is configured to move the capture plate 120 in various directions, and to facilitate the capture, storage, and launch of the VTOL vehicle 101. For example, in embodiments in which the capture plate 120 is mounted on a recovery vehicle or ship (for example, as depicted in FIGS. 7-13 and described further below in connection therewith), the telescoping mast 124 can be utilized to raise the capture plate 120 above aerodynamic turbulence generated by such a recovery vehicle or ship. The telescoping mast 124 may also be used on ground recovery vehicles to provide for vertical shock absorption on rough roads when the capture plate 120 is mounted on a ground recovery vehicle.

As illustrated in FIG. 1, the capture plate 120 is preferably contoured to one or more specific types of VTOL vehicles 101 that the capture plate 120 is to be used in connection therewith, for example so that the VTOL vehicle 101 fits snug against the capture plate 120, with each duct 106 adjacent to a surface of the capture plate 120. This also aids in final orientation of the VTOL vehicle 101 during docking to guide the capture bar 112 into position for the capture jaws 122 to activate. Specifically, when this occurs, the aerodynamic side force pulls the VTOL vehicle 101 into place and holds it until the capture jaws 122 activate. However, the shape may vary in other embodiments.

The servo system 126 is configured to orient the capture plate with respect to a wind direction and an approach attitude of the VTOL vehicle 101 (for example, with respect to the VTOL body thereof), and to orient the capture plate 120 and the VTOL vehicle 101 for storage, in a preferred embodiment. In the embodiment depicted in FIG. 3, the servo system 126 comprises an elevation servo 128 and an azimuth servo 130. In one preferred embodiment, the elevation servo 128 receives instructions from one or more wind velocity sensors or VTOL attitude telemetry devices (not depicted), and implements these instructions to orient the capture plate 120 accordingly. For example, in one preferred embodiment, the elevation servo 128 may orient the capture plate 120 by one degree of pitch attitude per knot of airspeed. However, this may vary in other embodiments. Also in a preferred embodiment, the azimuth servo 130 receives instructions from wind direction sensors (not depicted) that provide heading commands to orient the azimuth servo 130 into the wind during VTOL capture.

Figure 4:
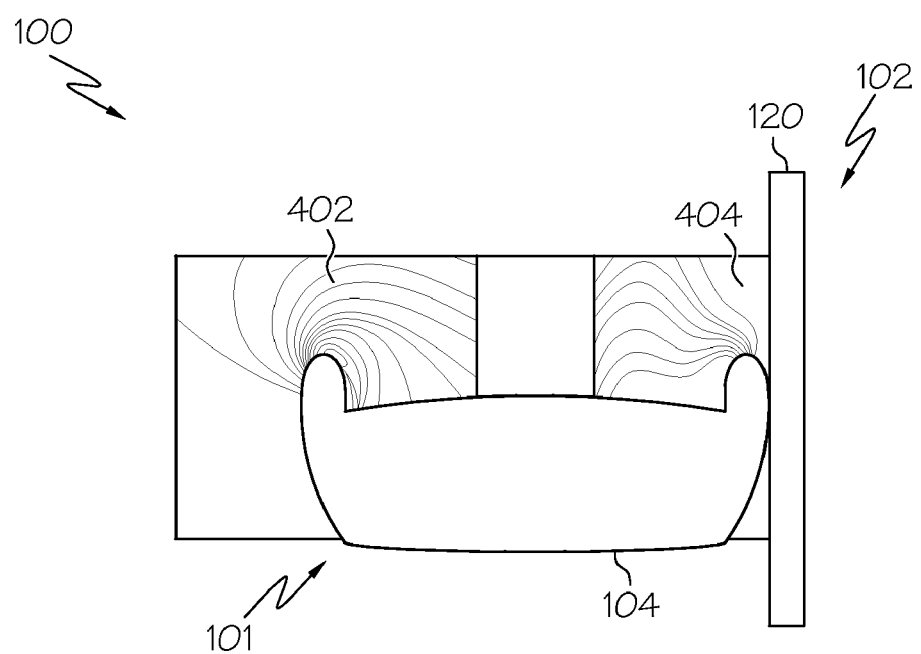
FIG. 4 is a side view of a portion of the VTOL vehicle and the launch and capture system of FIG. 1, shown in a position in which a duct of the VTOL vehicle is disposed adjacent to a capture plate of the launch and capture system, and shown along with airflow directed by a duct of the VTOL vehicle, in accordance with an exemplary embodiment of the present invention.

FIG. 4 is a side view of a portion of the VTOL vehicle 101 and the launch and capture system 102 of FIG. 1, shown in a position in which a duct 106 of the VTOL vehicle 101 is disposed adjacent to the capture plate 120 of the launch and capture system 102, and also depicting airflow 402 directed by the duct 106, in accordance with an exemplary embodiment of the present invention. As depicted in FIG. 4, when a duct 106 of the VTOL vehicle 101 is adjacent to the capture plate 120, a side force alters the airflow 402, generating a disturbance 404 in the airflow 402 surrounding the capture plate 120 (which is preferably in proximity to both side ducts 106, in the depicted embodiment in which the VTOL vehicle 101 includes two side ducts 106). In a preferred embodiment, the above-described aerodynamic side force is generated from the capture plate 120 with respect to each duct 106 when such duct 106 is within a distance from the capture plate 120 equal to one half of the diameter of the duct 106 or closer to the capture plate 120. When the ducts 106 come within this distance of the capture plate 120, this side force pulls and holds the ducts 106 toward and against the capture plate 120, thereby facilitating capture of the VTOL vehicle 101 and enabling docking operations. As long as the VTOL vehicle 101 thrusters 104 are operating, the side force remains active. The capture jaws 122 are used to hold the VTOL vehicle 101 in place when the thrusters 104 are shut off.

Figure 5:
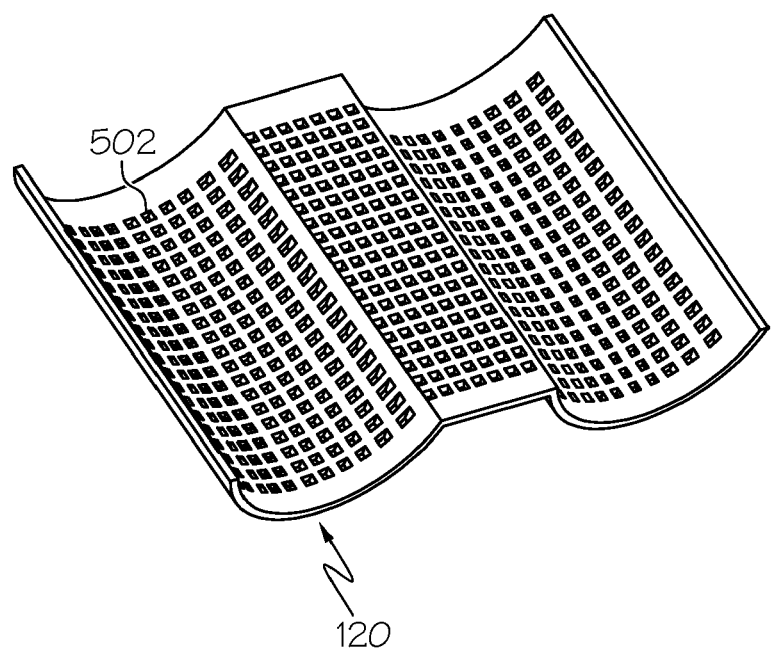
FIG. 5 is a close-up view of a portion of a capture plate of the launch and capture system of FIG. 1, in accordance with an exemplary embodiment of the present invention.

FIG. 5 is a close-up view of a portion of the capture plate 120 of FIG. 3, in accordance with an exemplary embodiment of the present invention. In the depicted embodiment, the capture plate 120 includes a plurality of ports 502. The ports 502 are configured to assist in controlling or adjusting the above-described aerodynamic side force between the capture plate 120 and the duct 106. Specifically, the aerodynamic side force can be selectively turned on and off, and/or can be selectively increased or reduced, by opening or closing the ports 502.

When the ports 502 are closed, the airflow around the duct 106 is altered or disturbed to a relatively greater extent, and air flow is reduced or eliminated around the capture plate 120. This increases the aerodynamic side force, to assist in holding the VTOL vehicle 101 against the capture plate 120. Conversely, when the ports 502 are opened, a greater amount of air flow is allowed around the duct 106. The airflow is thereby altered to a relatively lesser extent, thus effectively reducing or shutting off the aerodynamic side force and allowing the VTOL vehicle 101 to separate from the capture plate 120 for release and launch.

Figure 6:
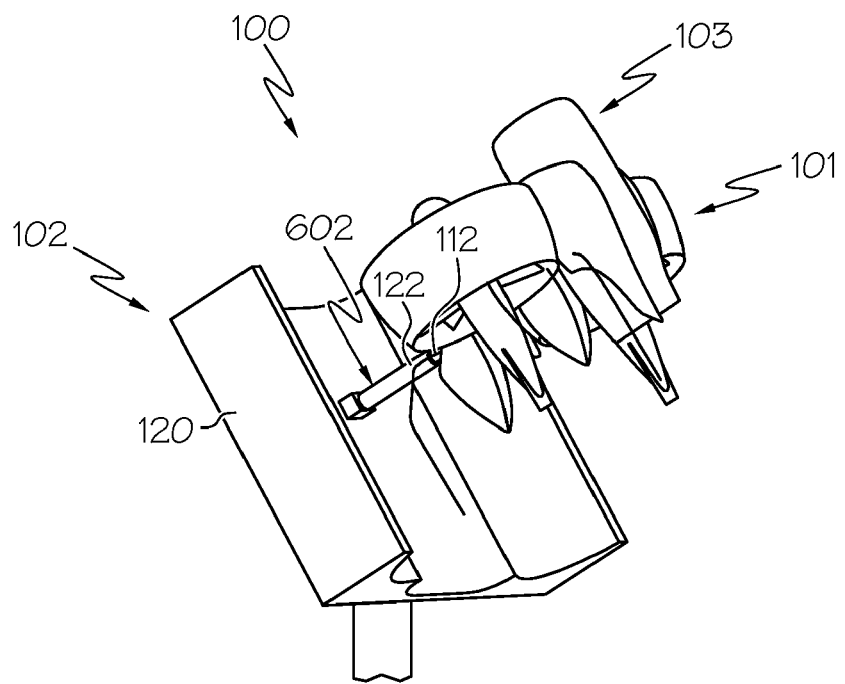
FIG. 6 is a perspective view of the VTOL vehicle and a portion of the launch and capture system of FIG. 1, shown with the VTOL vehicle held against a capture plate of the launch and capture system prior to release and launch, in accordance with an exemplary embodiment of the present invention.

FIG. 6 is a perspective view of a portion of the VTOL vehicle 101 and the launch and capture system 102 of FIG. 1, shown with the VTOL vehicle 101 held against the capture plate 120 prior to release and launch, in accordance with an exemplary embodiment of the present invention. As depicted in FIG. 6, a push rod 602 provides another means of releasing the VTOL vehicle 101 for launch. In the depicted embodiment, the push rod 602 is mounted on the capture plate 120, and the capture jaws 122 are in turn mounted on the push rod 602. This may vary in other embodiments. As described in further detail above, the capture jaws 122 engage the capture bar 112 of the VTOL vehicle 101 when the VTOL vehicle 101 is held against the capture plate 120. When release and launch of the VTOL vehicle 101 is desired (and the thrusters 104 are turned back on, accordingly), the push rod 602 forces the VTOL vehicle 101 away from the capture plate 120 by at least a distance equal to one half of the diameter of the duct 106. This reduces the aerodynamic side force below an amount that is required to maintain the VTOL vehicle 101 in place against the capture plate 120. In addition, the capture jaws 122 are opened, thereby releasing the capture bar 112 and the VTOL vehicle 101 for departure.

Figure 7:
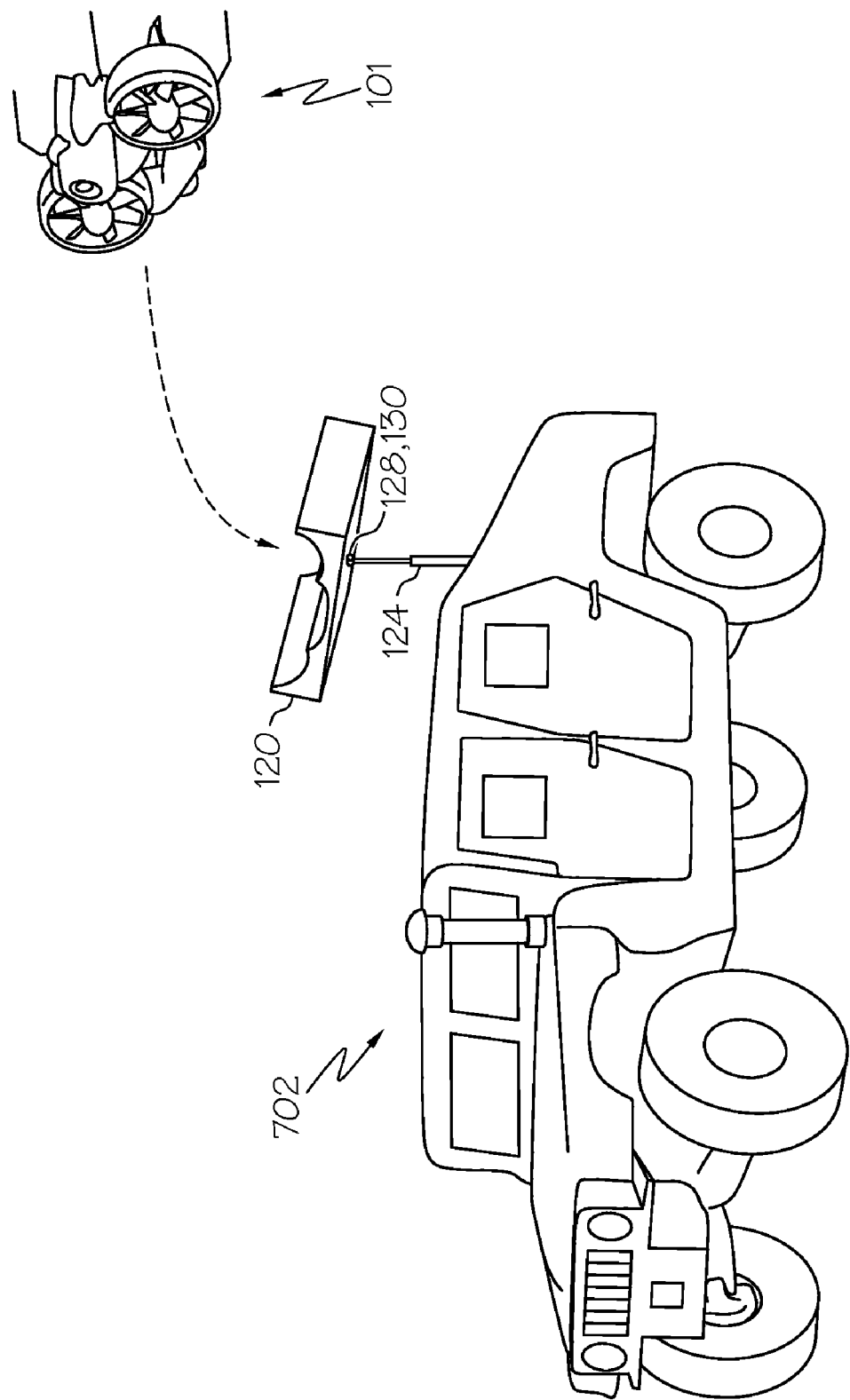
FIG. 7 is a perspective view of a VTOL vehicle, such as the VTOL vehicle of FIG. 1, shown on approach to a launch and capture system, such as the launch and capture system of FIG. 1, mounted on a recovery vehicle, in accordance with an exemplary embodiment of the present invention.

FIG. 7 is a perspective view of the VTOL vehicle 101 and the launch and capture system 102 of FIG. 2, shown with the VTOL vehicle 101 on approach to the capture plate 120 of the launch and capture system 102, and with the capture plate 120 mounted on a recovery vehicle 702, in accordance with an exemplary embodiment of the present invention. The rear of the recovery vehicle 702 forms a platform for mounting the telescoping mast 124 and a container into which a properly oriented capture plate 120 and VTOL vehicle 101 can be stored. The azimuth servo 130 and elevation servo 128 orient the capture plate 120 based at least in part on a wind speed, a direction from the wind speed, a recovery vehicle 702 speed and direction, and a VTOL vehicle 101 flight attitude. The telescoping mast 124 raises the capture plate 120 above wind turbulence generated by the recovery vehicle 702 and provides shock absorption for rough roads. Approach guidance is optionally provided through a global positioning system (GPS), a radio frequency beam, another optical means, and/or via another technique. Although the recovery vehicle 702 is depicted as a HMVEE in FIG. 7, it will be appreciated that any one of a number of other different types of recovery vehicles 702 may be used in other embodiments.

Figure 8:
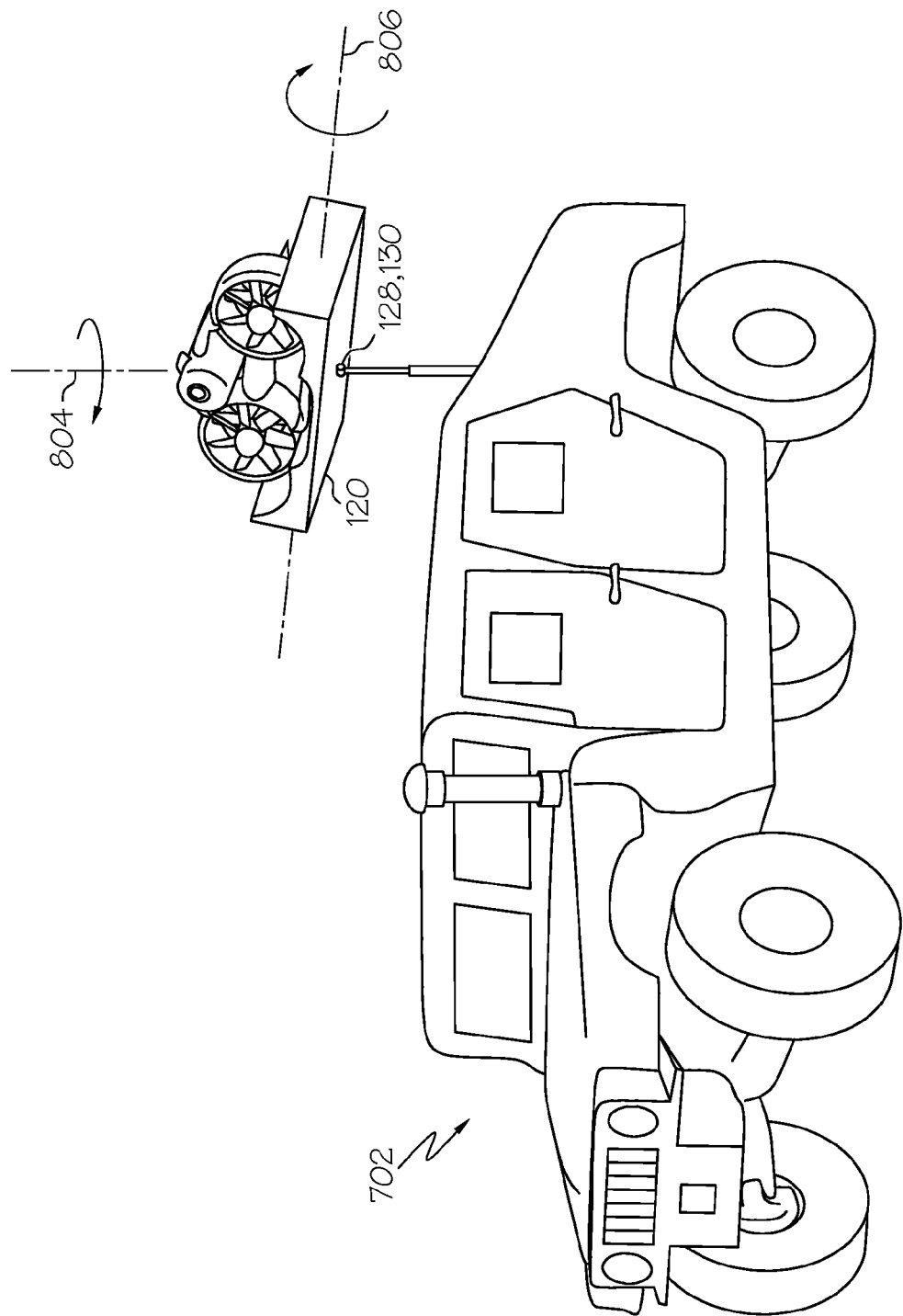
FIG. 8 is a perspective view of A VTOL vehicle, such as the VTOL vehicle of FIG. 1, shown stowed against a capture plate of a launch and capture system, such as the launch and capture system of FIG. 1, mounted on a recovery vehicle, in accordance with an exemplary embodiment of the present invention.

FIG. 8 is a perspective view of the VTOL vehicle 101 and the launch and capture system 102 of FIG. 1, shown with the VTOL vehicle 101 stowed against the capture plate 120 of the launch and capture system 102, and shown with the capture plate 120 mounted on the recovery vehicle 702 of FIG. 7, in accordance with an exemplary embodiment of the present invention. As shown in FIG. 8, the elevation servo 128 provides elevation rotation 806 to rotate the VTOL vehicle 101 and the capture plate 120 into a vertical position. The azimuth servo 130 provides azimuth rotation 804 to rotate the VTOL vehicle 101 into a rear orientation with the recovery vehicle 702 for stowing.

Figure 9:
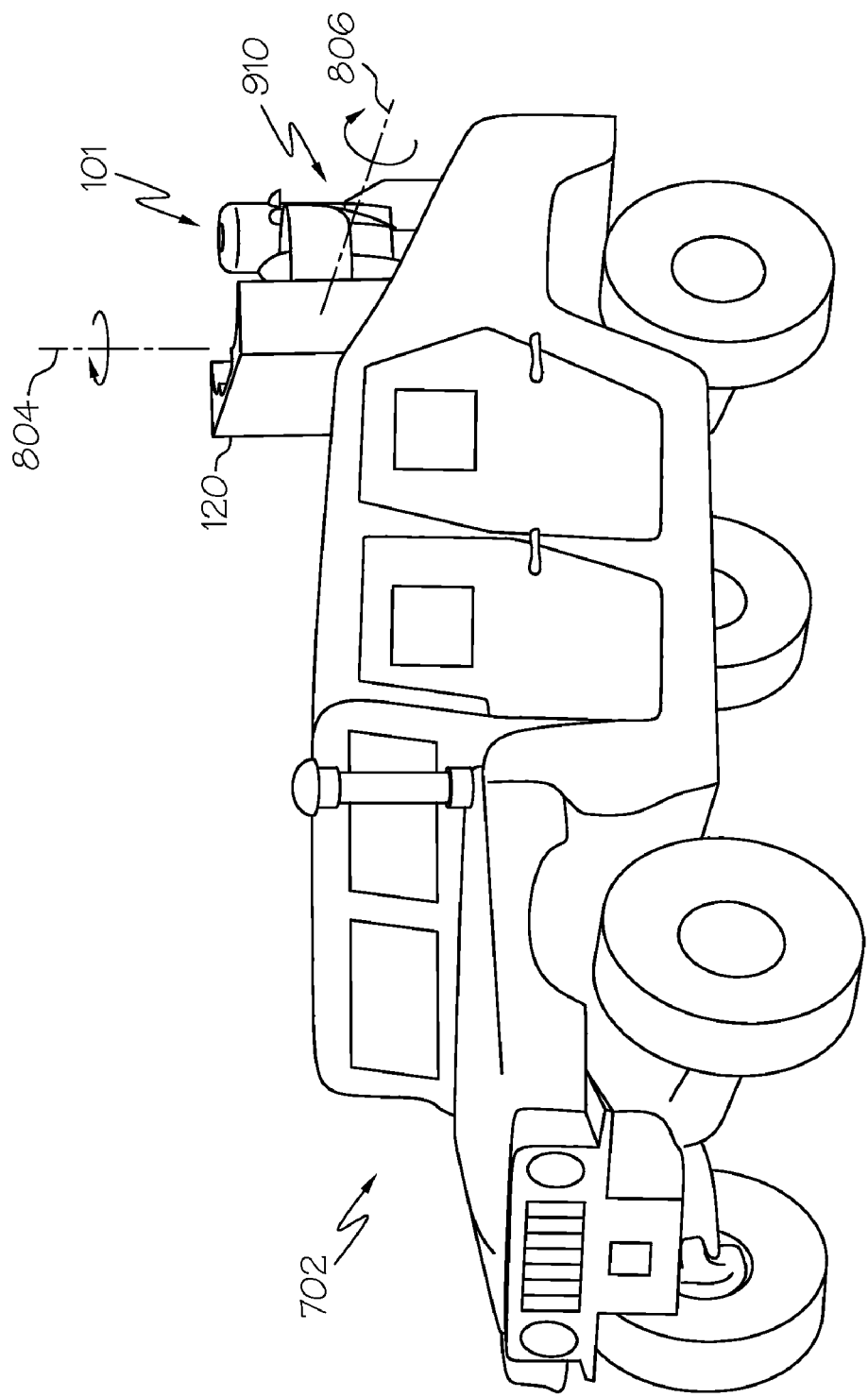
FIG. 9 is a perspective view of a VTOL vehicle, such as the VTOL vehicle of FIG. 1, shown stowed against a capture plate of a launch and capture system, such as the launch and capture system of FIG. 1, mounted and stored in a stowing area of a recovery vehicle, in accordance with an exemplary embodiment of the present invention.

FIG. 9 is a perspective view of the VTOL vehicle 101 and the launch and capture system 102 of FIG. 1, shown with the VTOL vehicle 101 stowed against the capture plate 120 of the launch and capture system and stored in a stowing area 910 of the recovery vehicle 702 of FIG. 7, in accordance with an exemplary embodiment of the present invention. As depicted in FIG. 9, the VTOL vehicle 101 and the capture plate 120 are lowered into the stowing area 910 of the recovery vehicle 702 by the telescoping mast 124.

In a preferred embodiment, all approach, docking, and stowing procedures are automated. Also in a preferred embodiment, procedures for deployment, orientation for launch, and release for flight are also automated, and follow a reverse procedure. Specifically, in such a preferred embodiment, when release and launch of the VTOL vehicle 101 is desired, the telescoping mast 124 raises the capture plate 120 and the VTOL vehicle 101 connected thereto out of the stowing area 910 and into a launch position. After the VTOL vehicle 101 is in the launch position, the thruster 104 is turned on, the capture jaws 122 of FIG. 1 release the capture bar 112, and the push rod 602 of FIG. 6 creates separation between the capture plate 120 and the ducts 106 in order to facilitate launch and release of the VTOL vehicle 101, as described in greater detail above.

Figure 10:
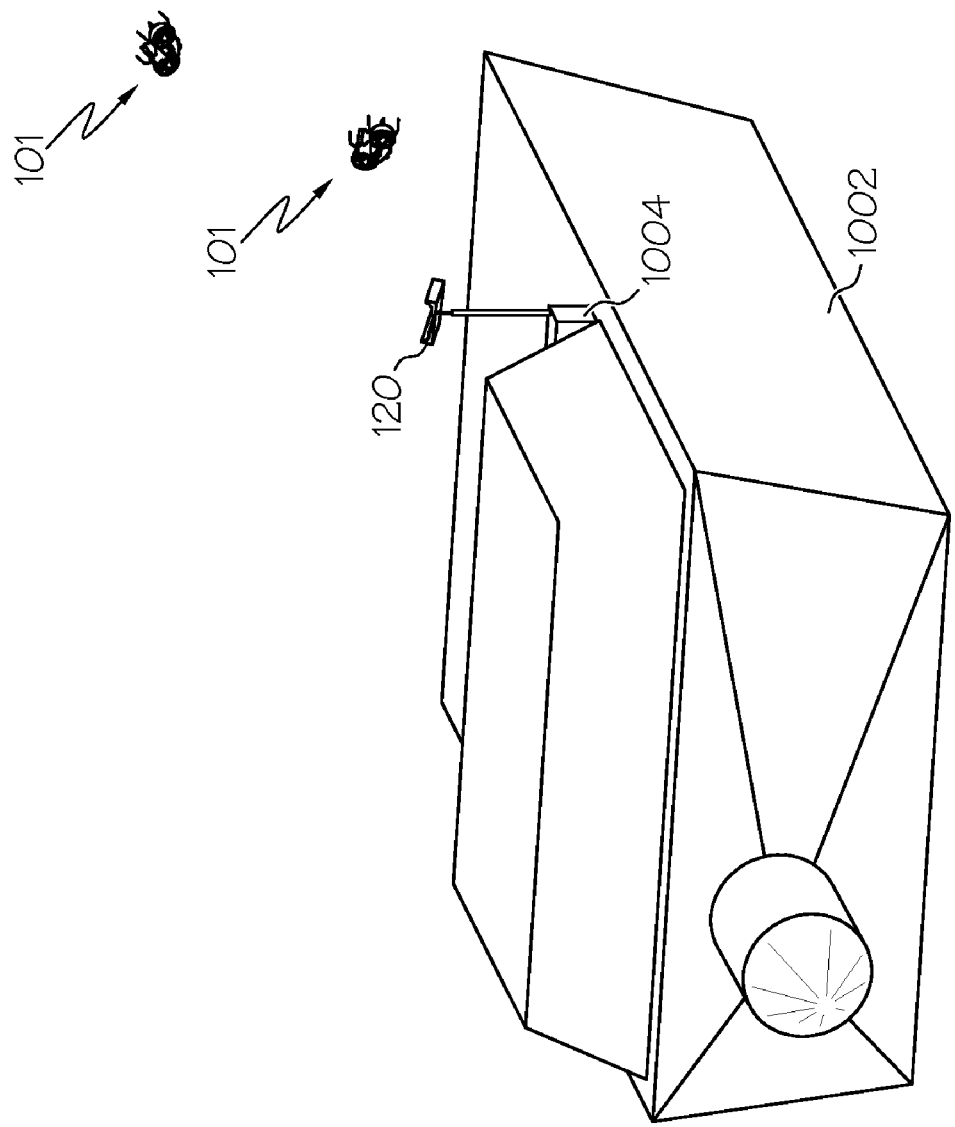
FIG. 10 is a perspective view of a VTOL vehicle, such as the VTOL vehicle of FIG. 1, shown approaching a recovery ship having a capture plate of a launch and capture system, such as the launch and capture system of FIG. 1, mounted thereon, in accordance with an exemplary embodiment of the present invention.

FIG. 10 is a perspective view of the VTOL vehicle 101 and the launch and capture system 102 of FIG. 1, shown with the VTOL vehicle 101 approaching the capture plate 120 of the launch and capture system 102, and with the capture plate 120 mounted on a recovery ship 1002, in accordance with an exemplary embodiment of the present invention. In the depicted embodiment, the telescoping mast 124 and the capture plate are mounted in a container 1004 of the recovery ship 1002. In a preferred embodiment, the container 1004 comprises and will be hereafter referenced as an autonomous re-outfitting littoral container 1004; however, various other different types of containers 1004 can also be used. The VTOL vehicle 101 tracks the capture plate 120 position and motion through one or more techniques such as, by way of example only, global positioning system (GPS) technology, radio frequency beams, and/or optical means during approach and docking. This system tracking allows the VTOL vehicle 101 to be captured, docked, and released on a recovery ship 1002 even in adverse conditions, such as on a heaving, rolling, pitching recovery ship 1002 in heavy sea states. While the recovery ship 1002 is depicted as a littoral combat ship (LCS) in FIG. 10, it will be appreciated that other types of recovery ships 1002 may also be utilized in other embodiments.

FIG. 11 is a perspective view of multiple VTOL vehicles 101 docked against respective capture plates 120 of one or more launch and capture systems 102 mounted on the recovery ship 1002 of FIG. 10, in accordance with an exemplary embodiment of the present invention. Specifically, in FIG. 11, one VTOL vehicle 101 is shown docked on its respective capture plate 120 on a raised telescoping mast 124 mounted on the recovery ship 1002 (for example, immediately following capture), while another VTOL vehicle 101 is shown stowed in its respective capture plate 120 in the autonomous re-outfitting littoral container 1004 of the recovery ship 1002.

Figure 12B:
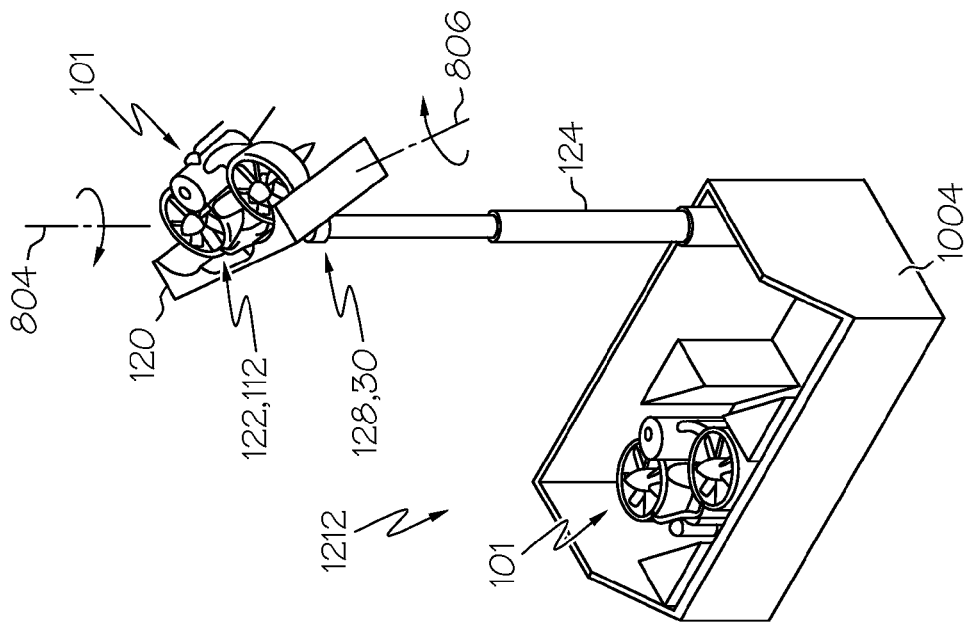
FIG. 12 is a collection of perspective views of two VTOL vehicles, such as the VTOL vehicle of FIG. 1, along with two capture plates of two launch and capture systems, such as the launch and capture system of FIG. 1, and a storage container that can be implemented in connection with a recovery ship, in accordance with an exemplary embodiment of the present invention.
Figure 12A:
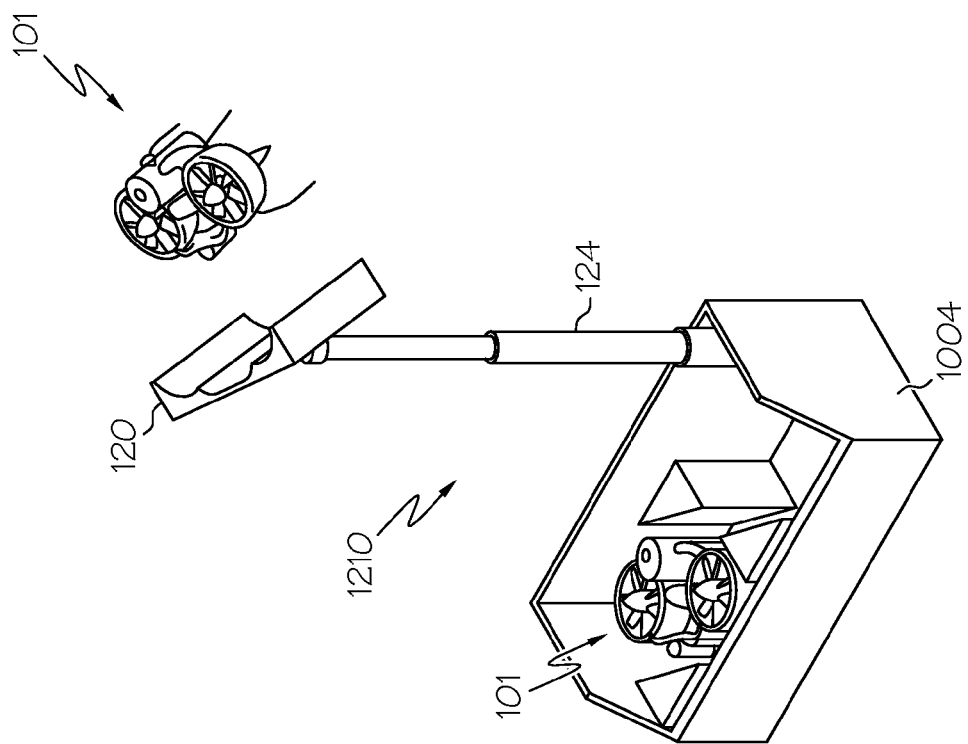
Figure 12C:
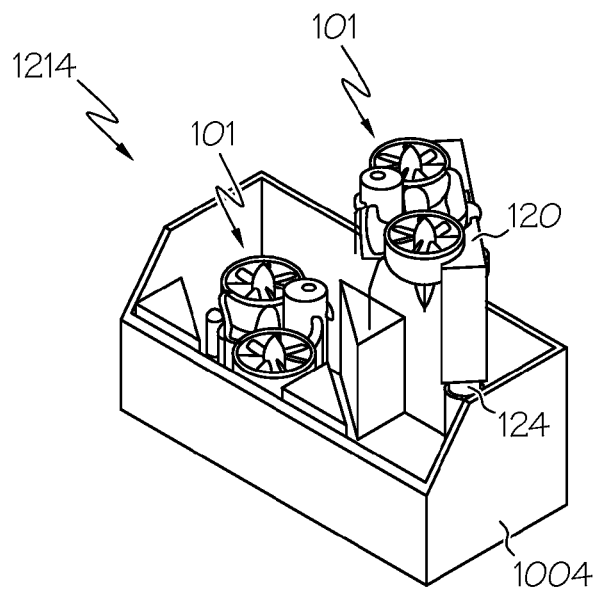

FIG. 12 is a collection of perspective views of multiple VTOL vehicles 101 that are launched and captured by respective capture plates 120 of one or more launch and capture systems 102, and that are configured to be stored in a common storage container, such as the autonomous re-outfitting littoral container 1004 of FIG. 10, in accordance with an exemplary embodiment of the present invention. FIG. 12 depicts each capture plate 120 having a respective telescoping mast 124 for capturing, holding, and releasing the respective VTOL vehicle 101. This is depicted in FIG. 12 in three collective positions, namely a first position 1210 (depicted in FIG. 12A), a second position 1212 (depicted in FIG. 12B), and a third position 1214 (depicted in FIG. 12C).

In the first position 1210, a first VTOL vehicle 101 is stowed in the autonomous re-outfitting littoral container 1004, while a second VTOL vehicle 101 is approaching its capture plate 120. In the second position 1212, the first VTOL vehicle 101 remains stowed in the autonomous re-outfitting littoral container 1004, while the second VTOL vehicle 101 has now reached its respective capture plate 120, and is being held against its respective capture plate 120. During capture the capture jaws 122 grasp the capture bar 112 of the second VTOL vehicle 101 (as described above in connection with FIGS. 1-3), allowing the thrusters 104 of the second VTOL vehicle 101 to shut off. Once the thrusters 104 (or the engine (s) controlling the thrusters) are shut off, the elevation servo 128 provides elevation rotation 806 to rotate the second VTOL vehicle 101 and its respective capture plate 120 into a vertical position.

The azimuth servo 130 provides azimuth rotation 804 to rotate the second VTOL vehicle 101 into a stowing orientation with the autonomous re-outfitting littoral container 1004. The telescoping mast 124 then lowers the second VTOL vehicle 101 and its respective capture plate 120 into the stowed position, as represented in the third position 1214 of FIG. 12. Specifically, in the third position 1214 of FIG. 12, the first VTOL vehicle 101 remains stowed in the autonomous re-outfitting littoral container 1004, while the second VTOL vehicle 101 is shown approaching its storage position in the autonomous re-outfitting littoral container 1004. It will be appreciated that the above-described features may vary in other embodiments. For example, multiple VTOL vehicles 101 may be captured or released simultaneously in certain embodiments. It will similarly be appreciated that any number of VTOL vehicles 101, capture plates 120, and/or storage containers may be included.

Figure 13:
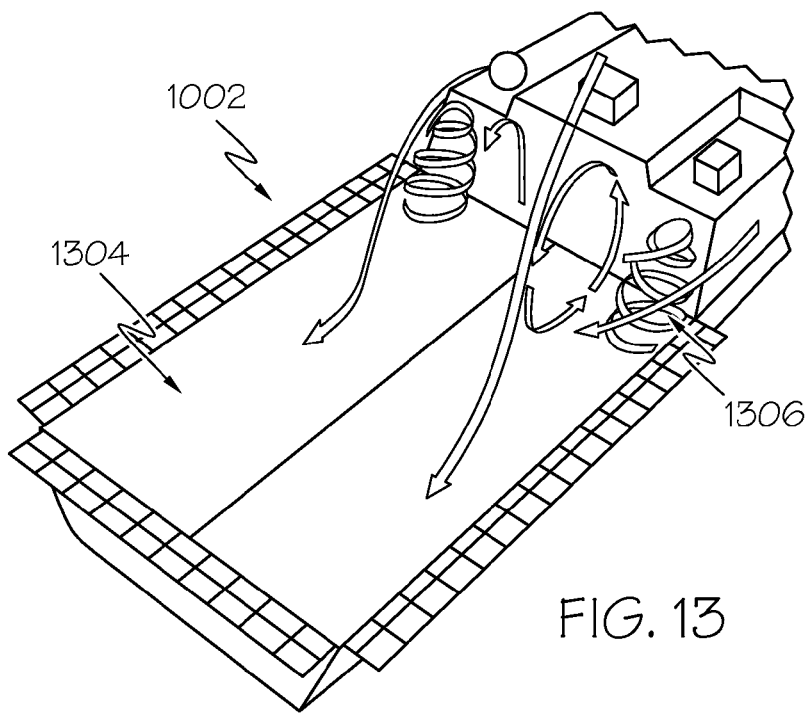
FIG. 13 is a perspective view of a deck of a recovery ship that can be used to house a launch and capture system, such as the launch and capture system of FIG. 1, in accordance with an exemplary embodiment of the present invention.

FIG. 13 is a perspective view of a deck 1304 of the recovery ship 1002 of FIGS. 10 and 11, in accordance with an exemplary embodiment of the present invention. As shown in FIG. 13, swirling and downward drafts along the length of the deck 1304 can result in significant wind speeds and turbulence 1306. The telescoping mast 124 of the launch and capture system 102 of FIG. 1 (described above in connection with FIGS. 1 and 3 and subsequent figures) is configured to raise the capture plate 120 and any VTOL vehicle 101 stored therein out of the turbulence 1306.

Accordingly, capture and release devices for VTOL vehicles and related systems are provided for improved capture of VTOL vehicles, so that a VTOL vehicle attaches itself to a capture plate when docking. These provide the ability to autonomously dock, capture and precisely place the captured VTOL vehicle in a re-outfitting station, and to effectively and easily re-launch the VTOL when desired. In addition, these allow for such launch and capture of VTOL ducted fan vehicles and/or other VTOL vehicles from a moving ground recovery vehicle or a recovery ship in adverse weather and/or other environmental conditions.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A launch and capture system for capturing a vertical take-off and landing (VTOL) vehicle comprising a thruster and a duct configured to direct airflow generated by the thruster, the launch and capture system comprising:
   a capture plate configured to alter the airflow and generate a force attracting the duct to the capture plate; and
   an extension coupled to the capture plate and configured to at least facilitate holding the VTOL vehicle against the capture plate.

2. The launch and capture system of claim 1, further comprising: a mast coupled to the capture plate.

3. The launch and capture system of claim 2, further comprising: a lift system coupled to the mast and configured to lift the mast.

4. The launch and capture system of claim 1, wherein the capture plate comprises a plurality of ports movable between an open position and a closed position.

5. The launch and capture system of 4, wherein the plurality of ports are configured to increase the force attracting the duct to the capture plate when at least one of the plurality of ports is moved from the open position to the closed position.

6. The launch and capture system of claim 1, further comprising:
   a rod coupled to the capture plate and configured to selectively at least facilitate separation of the VTOL vehicle from the capture plate.

7. The launch and capture system of claim 1, further comprising:
   a mounting device configured to mount the launch and capture system to a recovery vehicle; and
   a shock absorber coupled between the mounting device and the capture plate and configured to absorb shock from the recovery vehicle.

8. The launch and capture system of claim 1, further comprising:
   a servo system configured to orient the capture plate.

9. A launch and capture system for capturing a vertical take-off and landing (VTOL) vehicle comprising a thruster and a duct configured to direct airflow generated by the thruster, the launch and capture system comprising:
   a capture plate configured to alter the airflow and generate a force attracting the duct to the capture plate, the capture plate comprising a plurality of ports movable between an open position and a closed position; and
   a mast coupled to the capture plate.

10. The launch and capture system of claim 9, further comprising:
    an extension configured to at least facilitate holding the VTOL vehicle against the capture plate.

11. The launch and capture system of claim 9, further comprising:
    a rod coupled to the capture plate and configured to selectively at least facilitate separation of the VTOL vehicle from the capture plate.

12. The launch and capture system of claim 9, further comprising:
    a lift system coupled to the mast and configured to lift the mast.

13. The launch and capture system of claim 9, further comprising:
    a mounting device configured to mount the launch and capture system to a recovery vehicle; and
    a shock absorber coupled between the mounting device and the capture plate and configured to absorb shock from the recovery vehicle.

14. The launch and capture system of claim 9, further comprising:
    a servo system configured to orient the capture plate.

15. The launch and capture system of claim 9, further comprising the vertical take-off and landing (VTOL) vehicle comprising the thruster and the duct configured to direct airflow generated by the thruster.

16. The launch and capture system of 9, wherein the plurality of ports are configured to increase the force attracting the duct to the capture plate when at least one of the plurality of ports is moved from the open position to the closed position.

17. A method comprising:
    capturing, using a capture plate, a vertical take-off and landing (VTOL) vehicle comprising a thruster and a duct configured to direct airflow generated by the thruster, wherein the capture plate is configured to alter the airflow and generate a force attracting the duct to the capture plate; and
    engaging with the VTOL an extension coupled to the capture plate to assist holding the VTOL against the capture plate.

18. The method of claim 17, wherein the capture plate comprises a plurality of ports movable between an open position and a closed position, the method further comprising: moving at least one of the plurality of ports between the open position and the closed position to increase the force attracting the duct to the capture plate.

19. The method of claim 17, wherein the capture plate comprises a plurality of ports movable between an open position and a closed position, the method further comprising moving at least one of the plurality of ports between the closed position and the open position to decrease the force attracting the duct to the capture plate.

* * * * *